(12) United States Patent
Nakashiba (10) Patent No.: US 8,780,237 B2
(45) Date of Patent: *Jul. 15, 2014

(54) SOLID-STATE IMAGING APPARATUS, IMAGING METHOD, AND IMAGING SYSTEM

(71) Applicant: Renesas Electronics Corporation, Kanagawa (JP)

(72) Inventor: Yasutaka Nakashiba, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/677,877

(22) Filed: Nov. 15, 2012

(65) Prior Publication Data

US 2013/0076911 A1 Mar. 28, 2013

Related U.S. Application Data

(63) Continuation of application No. 11/802,643, filed on May 24, 2007, now Pat. No. 8,339,486.

(30) Foreign Application Priority Data

Jun. 1, 2006 (JP) ................................. 2006-153178

(51) Int. Cl.
| | |
|---|---|
| *H04N 7/18* | (2006.01) |
| *H04N 7/00* | (2011.01) |
| *H04N 5/222* | (2006.01) |
| *H04N 9/083* | (2006.01) |
| *H04N 3/14* | (2006.01) |
| *H04N 5/335* | (2011.01) |
| *H04N 9/04* | (2006.01) |
| *G09B 9/00* | (2006.01) |

(52) U.S. Cl.
USPC ............ 348/272; 348/294; 348/371; 382/124

(58) Field of Classification Search
USPC .......................... 348/294–308, 371, 271–283; 382/124–126, 115–116, 313–315; 250/208.1; 257/291–293
See application file for complete search history.

(56) References Cited

U.S. PATENT DOCUMENTS

| | | | |
|---|---|---|---|
| 4,318,123 A | | 3/1982 | Knop |
| 5,246,002 A | * | 9/1993 | Prosser ......................... 600/336 |

(Continued)

FOREIGN PATENT DOCUMENTS

| | | |
|---|---|---|
| CN | 1402183 | 3/2003 |
| CN | 1770463 | 5/2006 |

(Continued)

OTHER PUBLICATIONS

Chinese Patent Office issued a Chinese Office Action dated Jun. 6, 2009, Application No. 200710108837.8.

(Continued)

*Primary Examiner* — Roberto Velez
*Assistant Examiner* — Tuan Le
(74) *Attorney, Agent, or Firm* — Young & Thompson (57) ABSTRACT

A solid-state imaging apparatus 10 includes a solid-state imaging device 40, and a color filter 16 constituted of a first color filter 16a (first filter) and a second color filter 16b (second filter). The solid-state imaging device 40 photoelectrically converts light incident to a face S1 (first face) thereof to thereby capture an image of an object to be imaged. Arranged on the face S1 of the solid-state imaging device 40 is the first color filter 16a and second color filter 16b. The first color filter 16a is a filter that allows first wavelength band light to be selectively transmitted therethrough; the second color filter 16b is a filter that allows second wavelength band light in the longer wavelength side relative to the first wavelength band to be selectively transmitted therethrough.

5 Claims, 6 Drawing Sheets

(56) References Cited

U.S. PATENT DOCUMENTS

| | | | |
|---|---|---|---|
| 6,001,860 A | 12/1999 | Hamanaka | |
| 6,100,929 A | 8/2000 | Ikeda et al. | |
| 6,292,576 B1 * | 9/2001 | Brownlee | 382/124 |
| 6,633,656 B1 | 10/2003 | Picard | |
| 6,829,375 B1 | 12/2004 | Higuchi | |
| 6,885,398 B1 | 4/2005 | Sladen | |
| 7,084,415 B2 | 8/2006 | Iwai | |
| 7,181,052 B2 * | 2/2007 | Fujieda | 382/124 |
| 7,310,133 B2 | 12/2007 | Nagasaka et al. | |
| 7,364,936 B2 | 4/2008 | Hong | |
| 7,477,034 B2 | 1/2009 | Mackay | |
| 7,526,111 B2 * | 4/2009 | Miura et al. | 382/126 |
| 7,609,864 B2 | 10/2009 | Nagasaka et al. | |
| 7,634,116 B2 * | 12/2009 | Sato | 382/124 |
| 7,719,575 B2 * | 5/2010 | Makita et al. | 348/222.1 |
| 7,735,729 B2 | 6/2010 | Rowe | |
| 7,794,394 B2 * | 9/2010 | Frangioni | 600/160 |
| 7,995,808 B2 | 8/2011 | Rowe et al. | |
| 8,103,064 B2 | 1/2012 | Nagasaka et al. | |
| 8,229,185 B2 * | 7/2012 | Ennis et al. | 382/124 |
| 2003/0025897 A1 | 2/2003 | Iwai | |
| 2003/0228037 A1 | 12/2003 | Endo | |
| 2004/0184641 A1 * | 9/2004 | Nagasaka et al. | 382/124 |
| 2004/0256867 A1 | 12/2004 | Evans et al. | |
| 2005/0143652 A1 * | 6/2005 | Sato | 600/431 |
| 2005/0265586 A1 * | 12/2005 | Rowe et al. | 382/124 |
| 2006/0081955 A1 | 4/2006 | Hong | |
| 2006/0092299 A1 | 5/2006 | Suzuki | |
| 2006/0177107 A1 | 8/2006 | Ishii | |
| 2006/0182318 A1 | 8/2006 | Shigeta | |
| 2006/0239514 A1 * | 10/2006 | Watanabe et al. | 382/115 |
| 2006/0247533 A1 * | 11/2006 | Abe | 600/476 |
| 2008/0258249 A1 | 10/2008 | Hong | |
| 2009/0232367 A1 * | 9/2009 | Shinzaki | 382/124 |

FOREIGN PATENT DOCUMENTS

| | | |
|---|---|---|
| JP | 11-355667 | 12/1999 |
| JP | 2000-217803 | 8/2000 |
| JP | 2000-329928 | 11/2000 |
| JP | 2003-110823 | 4/2003 |
| JP | 2004-185109 | 7/2004 |
| JP | 2004-234040 | 8/2004 |
| JP | 2005-017828 | 2/2005 |
| JP | 2005-168627 | 6/2005 |
| JP | 2006-98340 | 4/2006 |
| JP | 2006-109240 | 4/2006 |
| WO | 2005-017828 | 2/2005 |

OTHER PUBLICATIONS

Japanese Official Action—2006-153178—Jan. 24, 2012.
JP Office Action dated Aug. 4, 2011 with English translation.
Japanese Official Action—2006-153178—Mar. 15, 2011.

* cited by examiner

SOLID-STATE IMAGING APPARATUS, IMAGING METHOD, AND IMAGING SYSTEM

BACKGROUND OF THE INVENTION

1. Field of the Invention

The present invention relates to a solid-state imaging apparatus, and an imaging method and imaging system using the same.

2. Description of the Related Art

As a conventional solid-state imaging apparatus, there has been one disclosed in Japanese Patent Laid-Open No. 2000-217803, for example. The solid-state imaging apparatus described in this document is provided with many light receiving units two-dimensionally arranged, and captures an image of fingerprints of a finger which contacts a predetermined surface. In addition to Japanese Patent Laid-Open No. 2000-217803, technical documents of conventional art relating to the present invention includes Japanese Patent Laid-Open No. 2004-234040.

The present inventor has recognized as follows. In the solid-state imaging apparatus of Japanese Patent Laid-Open No. 2000-217803, although an element (for example, fingerprints of a finger) on the surface of an object to be imaged can be imaged, an element (for example, veins of a finger) in the interior of an object to be imaged cannot be imaged.

SUMMARY

A solid-state imaging apparatus according to the present invention includes: a solid-state imaging device having a first face incident with light and converting the light into image information; and a filter arranged on the first face of the solid-state imaging device, wherein the filter is composed only of a first filter allowing first wavelength band light to be transmitted therethrough; and a second filter allowing second wavelength band light to be transmitted therethrough, said first wavelength band light being different from said second wavelength band light.

This solid-state imaging apparatus includes the first and second filters that allow light of a different wavelength band to be selectively transmitted therethrough. As a result, an image (first image) obtained by shorter wavelength light, i.e., light transmitting through the first filter contains a substantial amount of information on the surface element of the object to be imaged. Meanwhile, an image (second image) obtained by longer wavelength light, i.e., light transmitting through the second filter contains information on the internal element of the object to be imaged as well as the information on the surface element. Accordingly, when a difference between the first image and the second image is calculated, an image of the internal element of the object to be imaged can be obtained.

An imaging method according to the present invention includes: receiving light of a first wavelength band from the object to thereby produce first information; receiving light of a second wavelength band from the object to thereby produce second information; and obtaining a difference between the first information and the second information.

In this imaging method, using the solid-state imaging apparatus of the present invention, the first and second images are obtained. Further, the difference image between these images is obtained. As a result, a clear image of the internal element of the object to be imaged can be obtained.

An imaging system according to the present invention includes: the solid-state imaging apparatus; and a difference calculation unit calculating a difference image between a first image being an image of the object to be imaged obtained by the first wavelength band light transmitting through the first filter and then entering the first face and a second image being an image of the object to be imaged obtained by the second wavelength band light transmitting through the second filter and then entering the first face.

This imaging system is provided with the solid-state imaging apparatus of the present invention and the difference calculation means. Accordingly, the first and second images can be obtained by the solid-state imaging apparatus, and the difference image between these images can be obtained by the difference calculation means. As a result, a clear image of the internal element of the object to be imaged can be obtained.

According to the present invention, there can be implemented the solid-state imaging apparatus, imaging method, and imaging system capable of obtaining a clear image of the internal element of an object to be imaged.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes. In explaining the drawings, the same reference numerals are applied to identical parts, and repeated explanation thereof is omitted.

Figure 1:
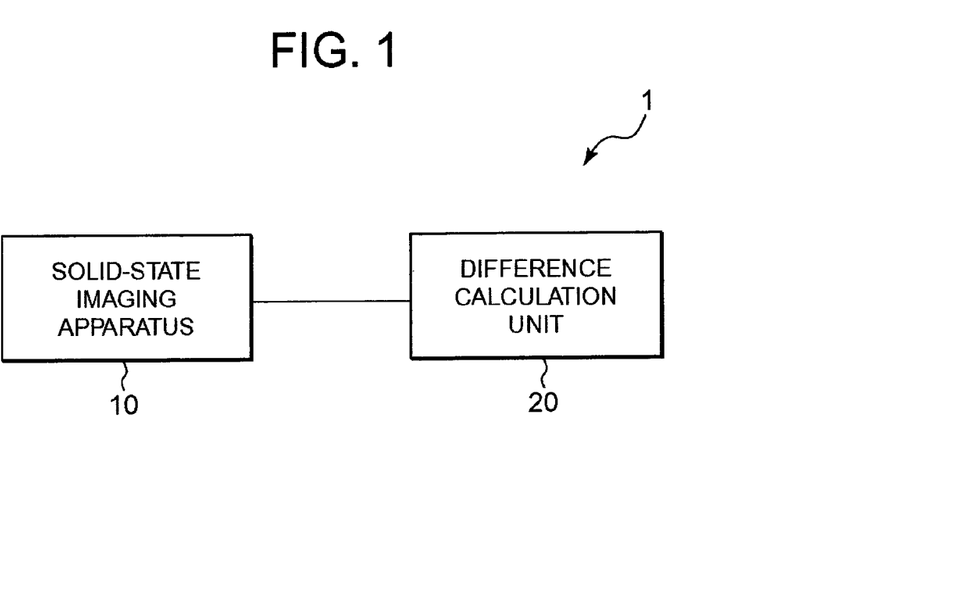
FIG. 1 is a block diagram illustrating one embodiment of an imaging system according to the present invention.

FIG. 1 is a block diagram illustrating one embodiment of an imaging system according to the present invention. An imaging system 1 includes a solid-state imaging apparatus 10 and a difference calculation unit 20. The difference calculation unit 20 is difference calculation means for calculating a difference image between a first and second image. The first and second image will be described later. The difference calculation unit 20 is a computer terminal, for example.

Figure 2:
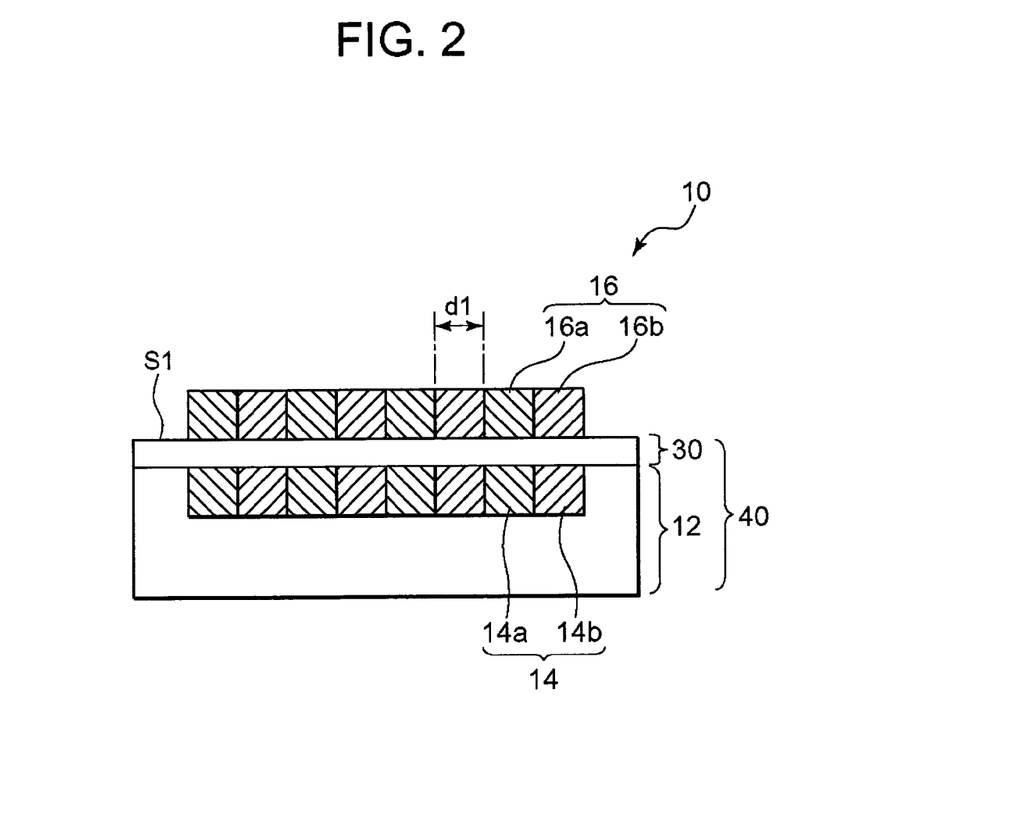
FIG. 2 is a cross-sectional view illustrating one embodiment of a solid-state imaging apparatus according to the present invention.

FIG. 2 is a cross-sectional view illustrating the solid-state imaging apparatus 10 being one embodiment of the solid-state imaging apparatus according to the present invention.

Figure 3:
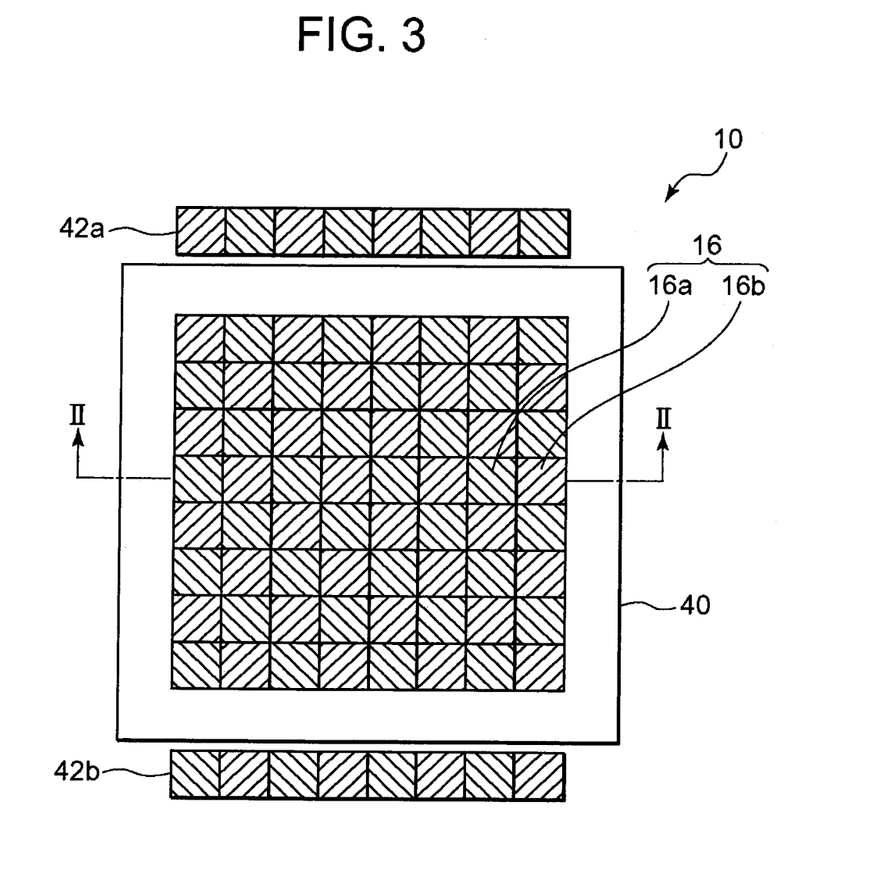
FIG. 3 is a plan view illustrating the solid-state imaging apparatus of FIG. 2.

Also FIG. 3 is a plan view illustrating the solid-state imaging apparatus 10. A cross-sectional view along the line II-II in FIG. 3 corresponds to FIG. 2.

The solid-state imaging apparatus 10 includes a solid-state imaging device 40, and a color filter 16 constituted of a first color filter 16a (first filter) and a second color filter 16b (second filter). The solid-state imaging device 40 has a semiconductor substrate 12 and an interconnect layer 30 formed thereon. According to the present embodiment, the semiconductor substrate 12 is a p-type silicon substrate. Interconnect s (not illustrated) are formed in the interconnect layer 30. The solid-state imaging device 40 photoelectrically converts light incident to a face S1 (first face) thereof to thereby take an image of an object to be imaged. Here, the face S1 of the solid-state imaging device 40 is equal to the surface of the interconnect layer 30.

A plurality of light receiving units 14 are formed in the semiconductor substrate 12. More specifically, the light receiving units 14 are arranged in the superficial layer of the semiconductor substrate 12. According to the present embodiment, the light receiving units 14 are an n-type impurity diffusion layer. The light receiving units 14 constitute a photodiode along with the adjoining semiconductor substrate 12.

Arranged on the face S1 of the solid-state imaging device 40 is the color filter 16 constituted of the first color filter 16a and second color filter 16b. The first color filter 16a is a filter that allows first wavelength band light to be selectively transmitted therethrough; the second color filter 16b is a filter that allows second wavelength band light in the longer wavelength side relative to the first wavelength band to be selectively transmitted therethrough. According to the present embodiment, the first wavelength band light is blue light; the second wavelength band light is red light.

According to the present embodiment, the first color filter 16a and second color filter 16b are, as illustrated in FIG. 3, arranged in a regular pattern in a plan view, and more specifically, arranged in a diagonal lattice pattern. Here, the expression "arrangement in a diagonal lattice pattern" means that the first color filter 16a and second color filter 16b are alternately arranged both longitudinally and laterally with one piece of the first color filter 16 adjacent to one piece of the second color filter 16b. Accordingly, the first color filter 16a and second color filter 16b are each distributed in plural portions on the face 1.

The light receiving unit 14 includes a light receiving unit 14a (first light receiving unit) positioned under the first color filter 16a, and a light receiving unit 14b (second light receiving unit) positioned under the second color filter 16b. In each portion in which the first color filters 16a are arranged, there are arranged one or more light receiving units 14a. Similarly, in each portion in which the second color filters 16b are arranged, there are arranged one or more light receiving units 14b.

The solid-state imaging apparatus 10 is further provided with a light source 42a (first light source) and a light source 42b (second light source). These light sources 42a and 42b are arranged close to the solid-state imaging device 40. The light source 42a is a light source that generates the first wavelength band light; the light source 42b is a light source that generates the second wavelength band light. That is, according to the present embodiment, the light sources 42a and 42b are a blue light source and a red light source, respectively. However, the light sources 42a and 42b may be both a white light source.

Figure 4:
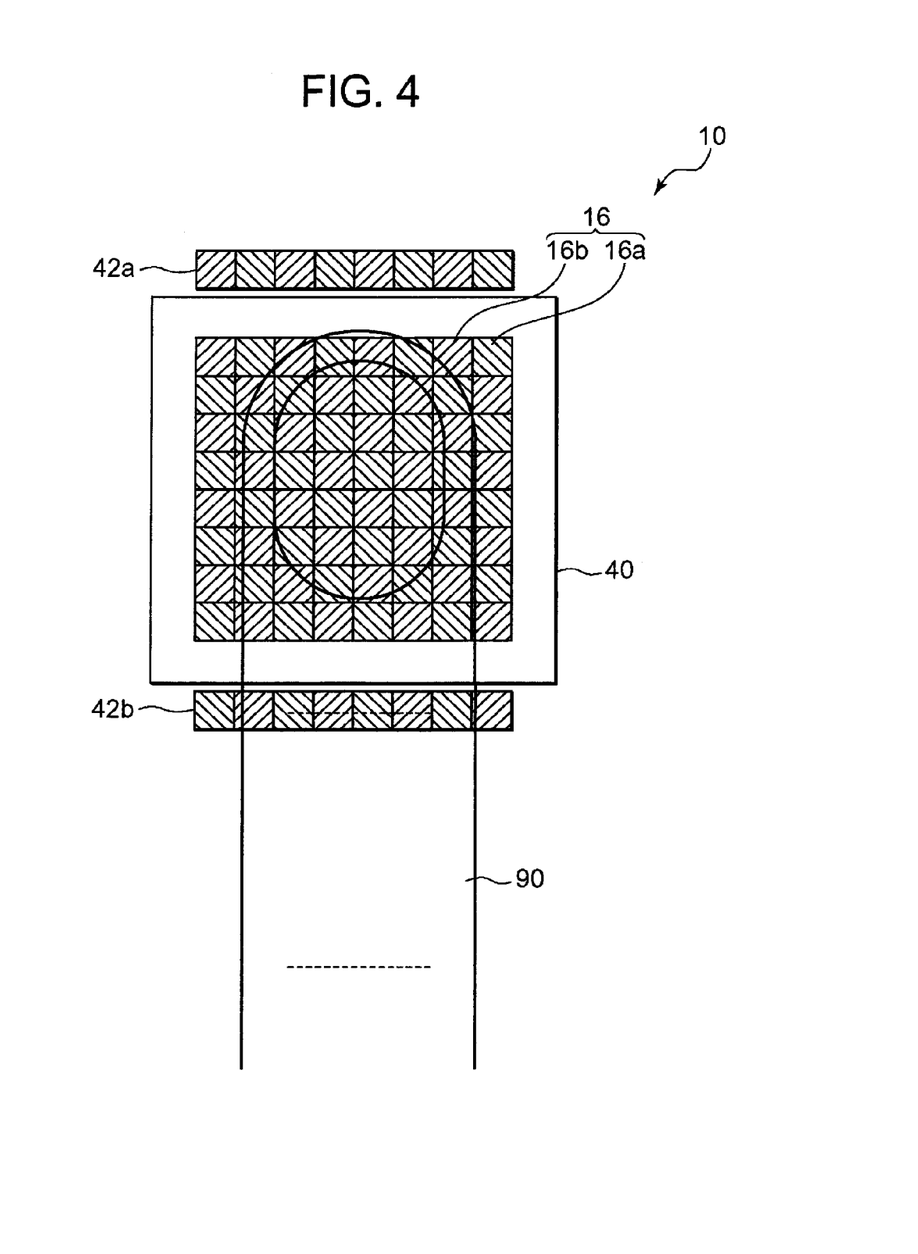
FIG. 4 is a plan view for explaining one embodiment of an imaging method according to the present invention.

As one embodiment of the imaging method according to the present invention, an exemplary operation of the imaging system 1 will be described with reference to FIG. 4. Referring to FIG. 4, a finger 90 being an object to be imaged is brought into contact to the surface of the solid-state imaging apparatus 10 (to the surface of the first color filter 16a and second color filter 16b). When light from the light sources 42a and 42b enters the finger 90, the light transmitting therethrough enters the face S1 of the solid-state imaging device 40.

Then, in the portion in which the second color filter 16b is arranged, red light having a longer wavelength is transmitted therethrough, and thus an image having a small signal difference between the fingerprint image and veins image is obtained. Consequently, as shown in the left diagram of FIG. 5, an image (second image) 96 of a fingerprint 92 and veins 94 is obtained. This image is an image of the object to be imaged obtained by the red light transmitting through the second color filter 16b and then entering the face 1. Meanwhile, in the portion in which the first color filter 16a is arranged, blue light having a shorter wavelength is transmitted therethrough, and thus an image having a large small signal difference between fingerprint image and veins image is obtained. Consequently, as shown in the central diagram of FIG. 5, an image (first image) 98 of the fingerprint 92 and veins 94 is obtained. This image is an image of the object to be imaged obtained by the blue light transmitting through the first color filter 16a and then entering the face 1.

In this manner, using the solid-state imaging apparatus 10, the first and second images are obtained. Thereafter, a difference image 100 being the difference between these images is calculated by the difference calculation unit 20. In the present embodiment, as shown in the right diagram of FIG. 5, this difference image 100 corresponds to the image of the veins 94. It is noted that, when the object to be imaged is as with this embodiment a finger, the gap between the first color filters 16a, and the gap between the second color filters 16b (the gaps being both a gap d1 in FIG. 2) must be both smaller than the gap between concave and convex in fingerprints of finger.

The advantageous effect of the present embodiment will be described. According to the present embodiment, there are provided the first color filter 16a and second color filter 16b that allow light of a different wavelength band to be selectively transmitted. Accordingly, the image (first image) 98 obtained by light having a shorter wavelength, i.e., light transmitting through the first color filter 16a contains much information on the surface element of an object to be imaged. Meanwhile, the image (second image) 96 obtained by light having a longer wavelength, i.e., light transmitting through the second color filter 16b contains information on the internal element of the object to be imaged as well as the surface element thereof. Consequently, when a difference between the first image 98 and second image 96 is calculated, a clear image of the internal element of the object to be imaged can be obtained. When the object to be imaged is as with the above example a finger, an image of the finger veins being the internal element can be obtained, and thus veins authentication can be performed by the imaging system 1. In addition, with the present embodiment, the images of fingerprints and veins can be simultaneously taken.

The light receiving unit 14 includes the light receiving unit 14a positioned under the portion in which the first color filter 16a is arranged, and a light receiving unit 14b positioned under the portion in which the second color filter 16b is arranged. Consequently, the light from the object to be imaged, transmitting through the first color filter 16a is received by the light receiving unit 14a and at the same time, the light from the object to be imaged, transmitting through the second color filter 16b is received by the light receiving unit 14b, whereby the first and second images can be obtained with high sensitivity.

When a plurality of the light receiving units 14a are arranged in the respective portions in which the first color filter 16a is arranged and at the same time, a plurality of the light receiving units 14b are arranged in the respective portions in which the second color filter 16b is arranged, then the first and second images can be obtained with high sensitivity.

The first color filter 16a and second color filter 16b are arranged in a diagonal lattice pattern in a plan view. Accordingly, when the object to be imaged is in a static condition, also, the first and second images can be properly obtained.

Figure 5:
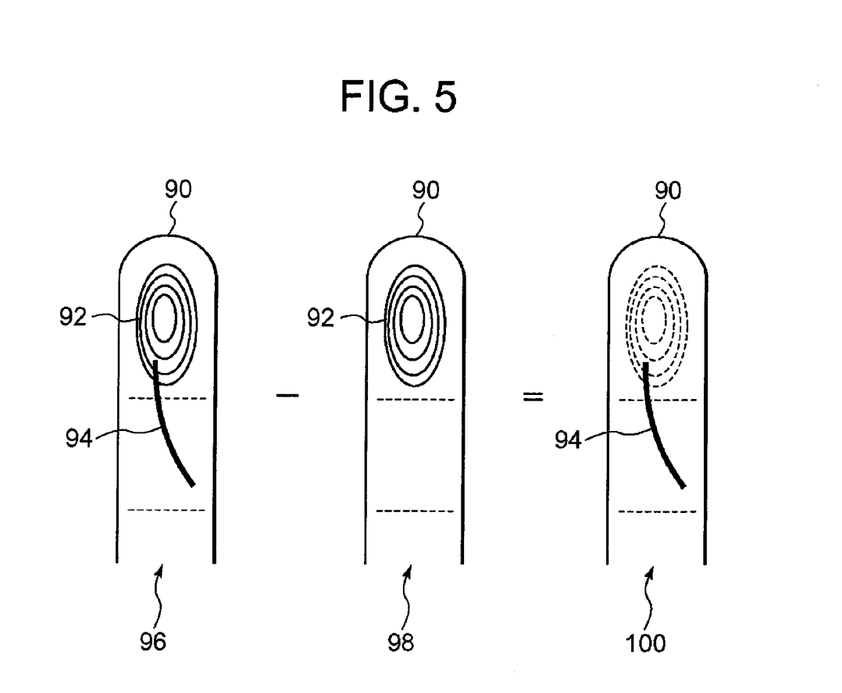
FIG. 5 is a view for explaining a first and second image and a difference image therebetween.

In Japanese Patent Laid-Open No. 2004-234040, there has been described an individual authentication apparatus in which an infra-red filter is arranged between a finger being an object to be imaged and an image sensor. However, a plurality of filters that transmit light of a different wavelength band are not provided. Thus, in the individual authentication apparatus of this document, it is not possible to properly capture the image of both fingerprints and veins. Also, noise (fingerprint image when a veins image is captured) cannot be eliminated. In contrast, according to the present embodiment, as illustrated in FIG. 5, a veins image is obtained by calculating a difference between an image of fingerprints and veins and an image of fingerprints. Accordingly, when the difference therebetween is calculated, the noise can be eliminated naturally.

Figure 6:
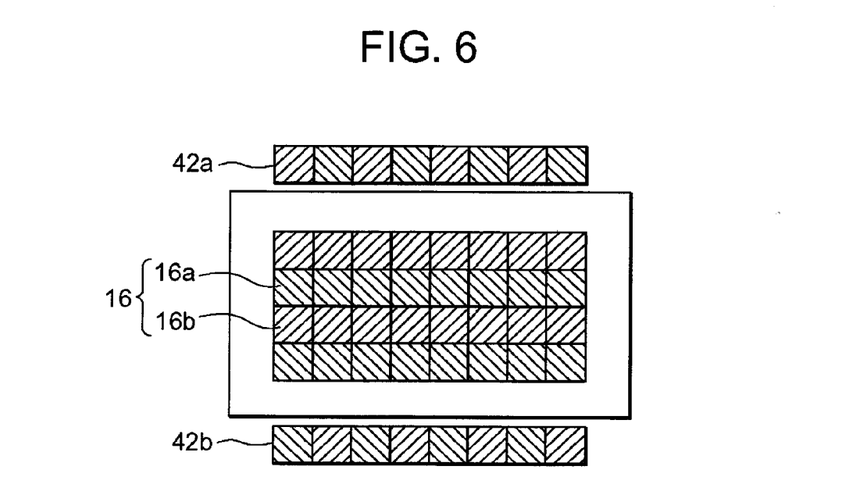
FIG. 6 is a plan view illustrating a solid-state imaging apparatus according to a variation of the embodiment.
Figure 7:
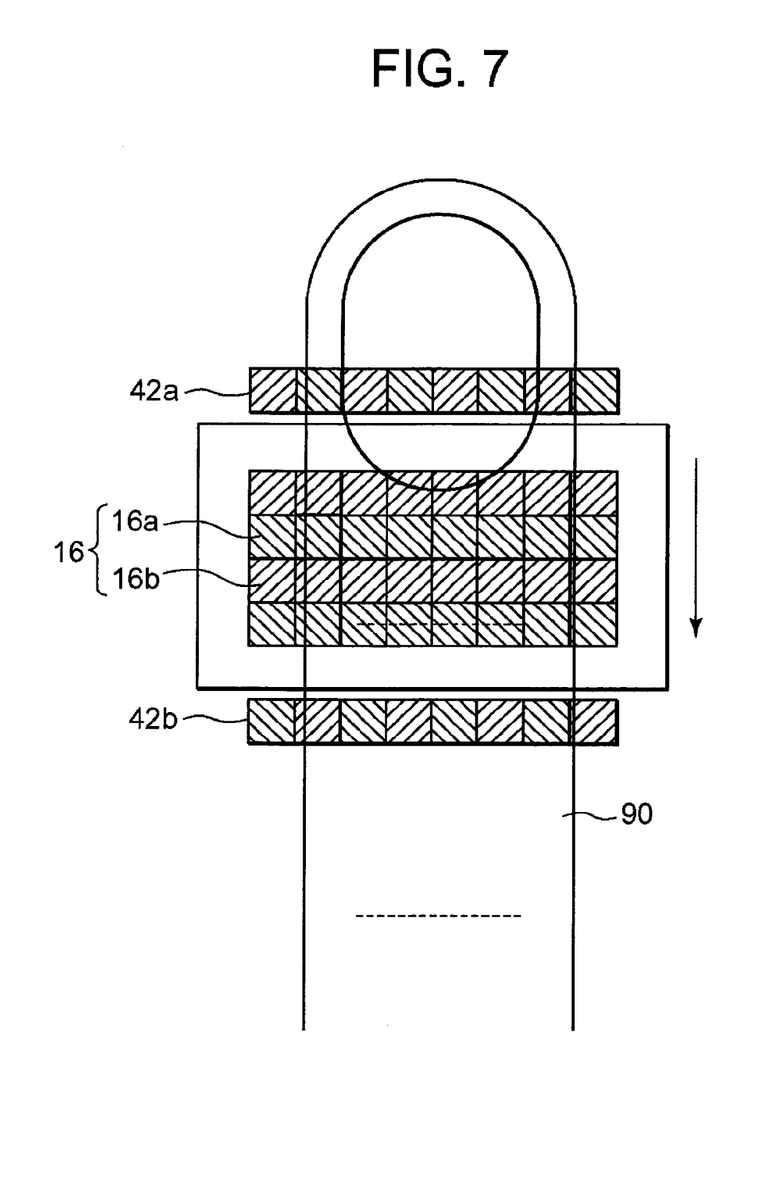
FIG. 7 is a plan view for explaining an example of imaging method using the solid-state imaging apparatus of FIG. 6.

The solid-state imaging apparatus, imaging method, and imaging system according to the present invention are not limited to the above described embodiment, and various variations are possible. For example, in the above embodiment, there is shown the example in which the first color filter 16a and second color filter 16b are arranged in a diagonal lattice pattern. However, the first color filter 16a and second color filter 16b may be, as illustrated in FIG. 6, arranged in a slit pattern. Here, the expression "arrangement in a slit pattern" means that a line of the first color filters 16a and a line of the second color filters 16b are alternately arranged. In this case, imaging is preferably performed while the object to be imaged is moved in an intra-surface direction of the face S1. FIG. 7 illustrates a way in which imaging is performed while a finger 90 being an object to be imaged is moved in a direction (vertical direction in FIG. 7) perpendicular to the longitudinal direction of the slit. Since imaging is performed while the object to be imaged is moved, even when the imaging area (the area in which the light receiving units 14a and 14b are arranged) is small, an image of a large part of the object to be imaged can be taken. This contributes to the smaller imaged area and even the smaller size of the entire solid-state imaging apparatus. In the solid-state imaging apparatus 10 illustrated in FIGS. 2 and 3, also, imaging may be performed while the object to be imaged is moved.

In the above described embodiment, as an example of the first wavelength band light and the second wavelength band light, there are shown blue light and red light, respectively. However, the light combination is not limited thereto, and another combination is also possible such as: light having wavelength close to blue light and light having wavelength close to red light; green light and red light; or green light and near-infrared light.

Figure 8:
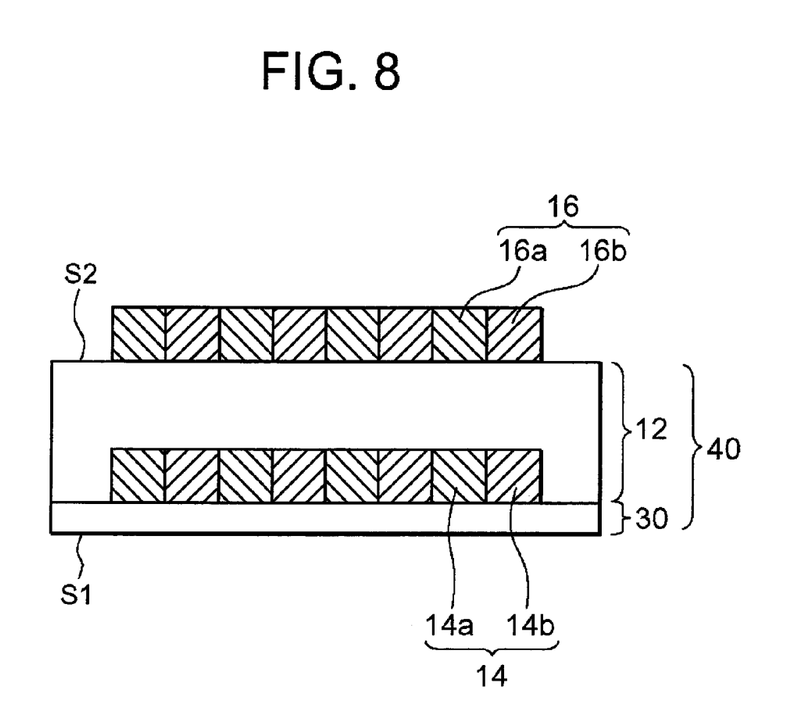
FIG. 8 is a cross-sectional view illustrating a solid-state imaging apparatus according to another variation of the embodiment.

Further, in the above described embodiment, p-type semiconductor substrate and n-type light receiving unit are shown as an example, but n-type semiconductor substrate and p-type light receiving unit are also possible. Further, the front-face incident type solid-state imaging apparatus is shown as an example, but a rear-face incident type solid-state imaging apparatus is also possible, as illustrated in FIG. 8. Referring to FIG. 8, the rear face S2 of the solid-state imaging apparatus 40 is the first face. More specifically, in the solid-state imaging apparatus 40 in FIG. 8, light incident to the rear face S2 is photoelectrically converted to take an object image. Here, the rear face S2 of the solid-state imaging apparatus 40 is equal to the rear face of the semiconductor substrate 12. Further, the present invention may be applied to a CCD (Charge Coupled Device) type solid-state imaging apparatus.

It is apparent that the present invention is not limited to the above embodiments, but may be modified and changed without departing from the scope and spirit of the invention.

What is claimed is:

1. An image system comprising:
   a first light receiving unit detecting a near-infrared light;
   a second light receiving unit arranged so as not to overlap the first light receiving unit when viewed from a direction of light entering the first light receiving unit and detecting a first wavelength band light;
   a first light source arranged around the first light receiving unit and generating the near-infrared light; and
   a calculation unit configured to calculate a difference image between a first image being an image of an object to be imaged obtained by the near-infrared light entering the first light receiving unit and a second image being an image of the object obtained by the first wavelength band light entering the second light receiving unit, wherein the first wavelength band light has shorter wavelength than the near-infrared light.

2. An image system according to claim 1 further comprising:
   a second light source arranged around the second light receiving unit and generating the first wavelength band light.

3. An image system according to claim 1, wherein the first wave length band light is green light.

4. An image system according to claim 1 further comprising:
   a first filter is arranged so as to overlap the first light receiving unit when viewed from a direction of light entering the first light receiving unit; and
   a second filter is arranged so as to overlap the second light receiving unit when viewed from a direction of light entering the second light receiving unit,
   wherein the first filter allows the near-infrared light to be transmitted therethrough, and
   wherein the second filter allows the first wavelength band light to be transmitted therethrough.

5. An image system according to claim 1 further comprising:
   a semiconductor substrate,
   wherein the first light receiving unit and the second light receiving unit is formed in the semiconductor substrate.

* * * * *